United States Patent
Jang et al.

(10) Patent No.: US 8,521,236 B2
(45) Date of Patent: Aug. 27, 2013

(54) MOBILE TERMINAL CAPABLE OF RECEIVING MOBILE BROADCAST SERVICES AND CHANNEL CONTROL METHOD THEREFOR

(75) Inventors: Hyo Eun Jang, Seoul (KR); Geum Goo Han, Suwon-si (KR); Seok Min Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 12/797,871

(22) Filed: Jun. 10, 2010

(65) Prior Publication Data

US 2010/0321589 A1  Dec. 23, 2010

(30) Foreign Application Priority Data

Jun. 17, 2009  (KR) ................. 10-2009-0053849

(51) Int. Cl.
  *H04M 1/00* (2006.01)
(52) U.S. Cl.
  USPC ........................ 455/574; 455/343.1
(58) Field of Classification Search
  CPC ..................................... H04W 52/02
  USPC ................. 455/574, 343.1–343.5, 3.01–3.02; 725/37–61
  See application file for complete search history.

(56) References Cited

U.S. PATENT DOCUMENTS

| 5,754,956 | A | 5/1998 | Abreu et al. |
| 2002/0029386 | A1* | 3/2002 | Robbins .......................... 725/56 |
| 2006/0030305 | A1 | 2/2006 | Lee et al. |
| 2007/0011701 | A1* | 1/2007 | Jung et al. ....................... 725/38 |
| 2009/0029671 | A1* | 1/2009 | Cho et al. ...................... 455/345 |
| 2009/0034444 | A1* | 2/2009 | Wang et al. .................... 455/574 |

* cited by examiner

*Primary Examiner* — Lana N Le
(74) *Attorney, Agent, or Firm* — Jefferson IP Law, LLP

(57) ABSTRACT

A mobile terminal capable of receiving mobile broadcast services and a channel control method for the same are provided. The channel control method includes outputting broadcast data present in a frame received on a current channel during a frame transport interval, scanning, during a sleep interval after the frame transport interval, for at least one frequency corresponding to a preset preference channel, extracting channel information by parsing a frame carried by the scanned frequency, and storing the extracted channel information while updating existing channel information. Hence, the channel search time experienced by the user for viewing channel information may be shortened.

14 Claims, 6 Drawing Sheets

MOBILE TERMINAL CAPABLE OF RECEIVING MOBILE BROADCAST SERVICES AND CHANNEL CONTROL METHOD THEREFOR

PRIORITY

This application claims the benefit under 35 U.S.C. §119(a) of a Korean patent application filed on Jun. 17, 2009 in the Korean Intellectual Property Office and assigned Serial No. 10-2009-0053849, the entire disclosure of which is hereby incorporated by reference.

BACKGROUND OF THE INVENTION

1. Field of the Invention

The present invention relates to a mobile terminal capable of receiving mobile broadcast services. More particularly, the present invention relates to a mobile terminal that can output broadcast data using a broadcast transmission scheme providing a sleep interval between consecutive frames carrying broadcast data, and a channel switching control method based on channel information update in the mobile terminal.

2. Description of the Related Art

A mobile broadcast service enables mobile terminals (e.g., cellular phones, laptop computers, personal digital assistants, and the like) to receive broadcast data. A user carrying a mobile terminal capable of receiving a mobile broadcast service may receive a desired broadcast at most times and places.

Examples of mobile broadcast systems providing broadcast services to mobile terminals include a Digital Multimedia Broadcasting (DMB) system, a Digital Video Broadcasting-Handheld (DVB-H) system, a Media Forward Link Only (FLO) system, and a Advanced Television System Committee-Mobile/Handheld (ATSC-MH) system. More particularly, the ATSC-MH system is employed mainly in North America including the USA, and specifies a sleep interval between consecutive frames carrying broadcast data.

More specifically, the ATSC-MH broadcasting system has an attribute referred to as a Parade Repetition Cycle (PRC), which specifies periodic transmission of broadcast data in units of frames of 0.968 seconds. A sleep interval of zero or several seconds is present between consecutive frames. In the ATSC-MH broadcasting system, multiple broadcasters may own specific frequency bands and broadcast transmitters of a single broadcaster may be located at different regions.

When the user issues a channel switch request during reception of a mobile broadcast service through a mobile broadcast system, the mobile terminal performs channel switching using stored channel information. A description is given below of a procedure for channel switching with reference to FIG. 1.

FIG. 1 is a flowchart illustrating a method for channel switching according to the related art.

Referring to FIG. 1, the mobile terminal enters into a mobile broadcast service mode for outputting broadcast data in step 110. The mobile terminal outputs broadcast data received through frequency corresponding to a channel selected by the user in step 120. The mobile terminal determines whether a channel switch request is issued in step 130.

When a channel switch request is issued, the mobile terminal conducts scanning for frequency corresponding to a newly selected channel in step 140. The mobile terminal analyzes a frame carried by the scanned frequency in step 150. The mobile terminal detects channel information in the analyzed frame in step 160. Here, the channel information describes broadcast data on the corresponding channel, and may be composed of text, speech and image data.

The mobile terminal displays the detected channel information in step 170. The mobile terminal tunes to the frequency corresponding to a channel selected by the user from the displayed channel information, and outputs broadcast data carried by the tuned frequency in step 180. Thereafter, the mobile terminal determines whether a request for terminating the mobile broadcast service mode is issued in step 190. When a request for terminating the mobile broadcast service mode is not issued, the mobile terminal returns to step 130.

In a case of the ATSC-MH system, one second is needed to receive one frame in frequency scanning for channel switching, and a frame carrying particular data is transmitted once for several seconds according to a given PRC. Hence, the mobile terminal may take a long time to display updated channel information. In addition, when the signal level of frequency corresponding to the target channel is not acceptable, the mobile terminal may be unable to provide a desired mobile broadcast service. In this case, the user may request another channel switch, and the channel switch may take additional time for channel switching until a desired mobile broadcast service is provided. For example, for conducting frequency scanning in relation to individual channels and displaying channel information, Terrestrial DMB (T-DMB), One-seg and ATSC-MH systems may take about 10 seconds, about 50 seconds and about 60 seconds, respectively. Hence, the user is inconvenienced by having to wait until updated channel information is displayed.

Therefore, a need exists for an apparatus and method for reducing the time for receiving updated channel information during channel switching in a mobile broadcast service.

SUMMARY OF THE INVENTION

An aspect of the present invention is to address the above-mentioned problems and/or disadvantages and to provide at least the advantages described below. Accordingly, an aspect of the present invention is to provide a mobile terminal capable of receiving a mobile broadcast service and a channel switching method for the same.

In accordance with an aspect of the present invention, a channel control method for a mobile terminal that receives a mobile broadcast service providing a sleep interval between successive frames carrying broadcast data is provided. The method includes outputting broadcast data present in a frame received on a current channel during a frame transport interval, scanning, during a sleep interval after the frame transport interval, for at least one frequency corresponding to a preset preference channel, extracting channel information by parsing a frame carried by the scanned frequency, and storing the extracted channel information while updating existing channel information.

In accordance with another aspect of the present invention, a mobile terminal capable of channel control is provided. The terminal includes a broadcast reception unit for receiving a frame carrying broadcast data on frequency corresponding to a selected channel, and scanning for at least one frequency corresponding to a preset preference channel, a display unit for outputting broadcast data, a control unit for identifying a sleep interval during which no frame is transmitted based on channel information of a received frame, for controlling the display unit to output broadcast data present in the received frame, for controlling the broadcast reception unit to frequency scan during the sleep interval, and for extracting channel information by parsing a received frame carried by the scanned frequency, and a storage unit for storing the extracted channel information while updating existing channel information for each frequency under the control of the control unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description, "mobile terminal" denotes an information processing apparatus having a display unit for outputting various data, and more particularly, capable of outputting broadcast data received from a broadcasting base station that transmits broadcast data through frequency assigned to a broadcaster. A mobile terminal may correspond to a notebook computer, a cellular phone, a Personal Digital Assistant (PDA), or a Moving Picture Experts Group Audio Layer 3 (MP3) player, which may be readily carried by a user.

Figure 1:
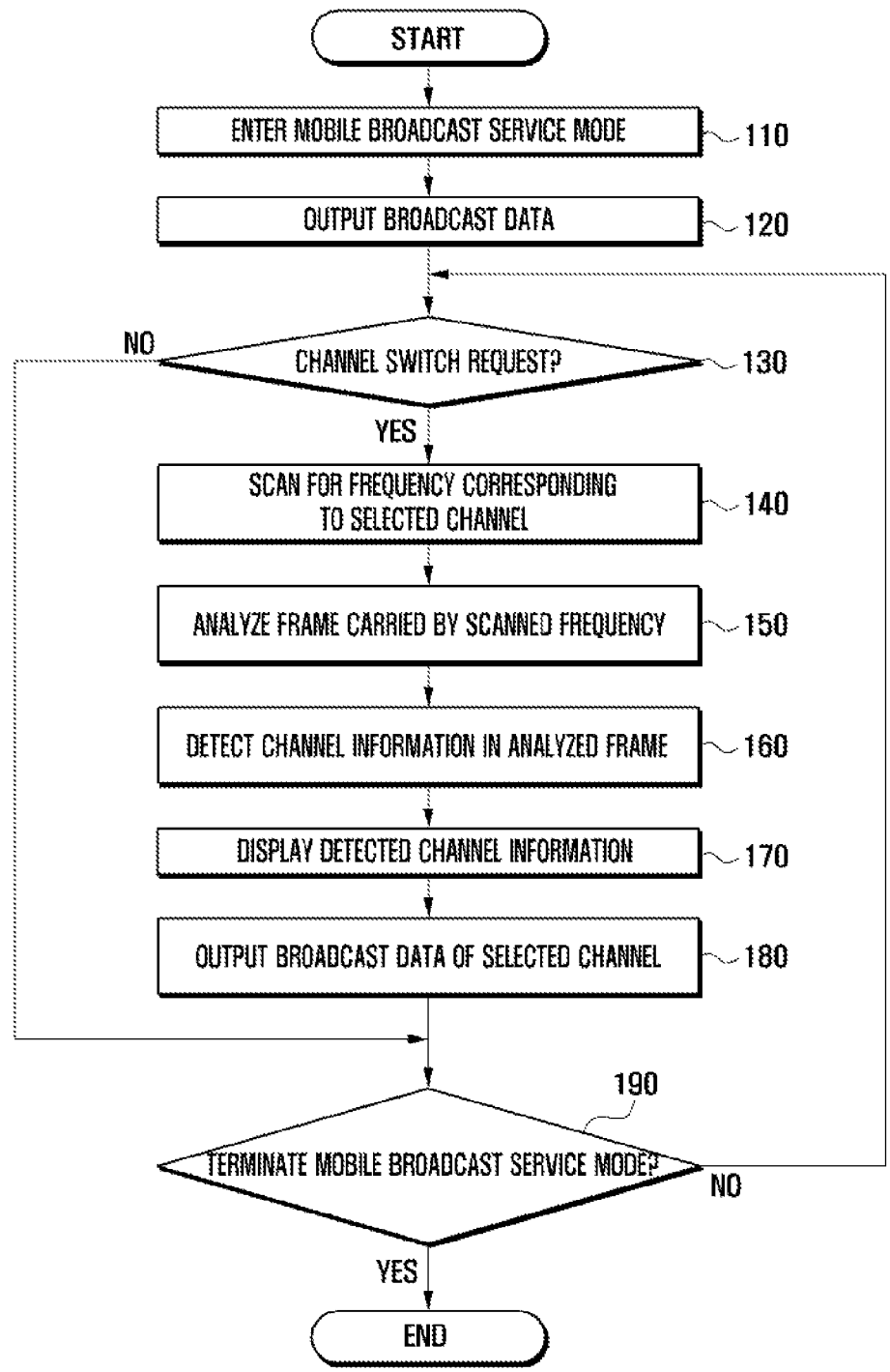
FIG. 1 is a flowchart illustrating a method for channel switching according to the related art.
Figure 2:
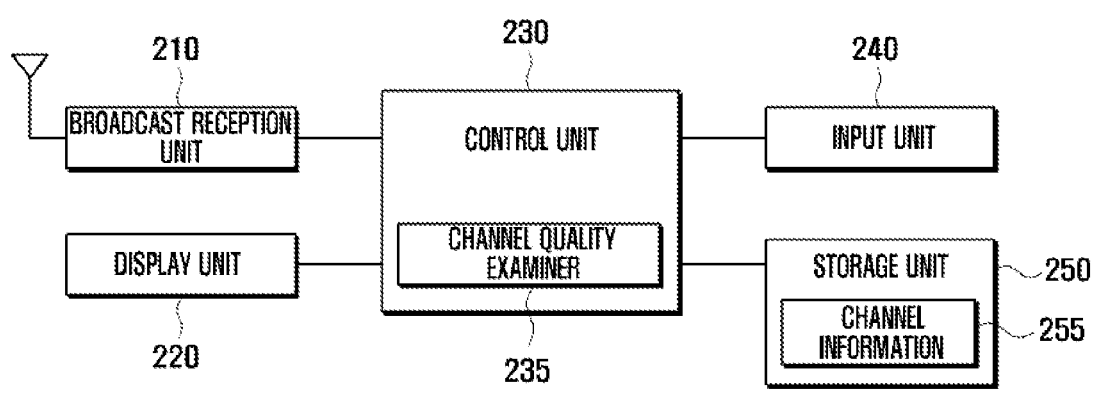
FIG. 2 is a block diagram of a mobile terminal according to an exemplary embodiment of the present invention.

FIG. 2 is a block diagram of a mobile terminal according to an exemplary embodiment of the present invention.

Referring to FIG. 2, the mobile terminal includes a broadcast reception unit 210, a display unit 220, a control unit 230 including a channel quality examiner 235, an input unit 240, and a storage unit 250.

The broadcast reception unit 210 may scan for frequency associated with a channel assigned to each broadcaster under the control of the control unit 230. The broadcast reception unit 210 may receive a frame carried by the scanned frequency from the broadcaster. The frame transmitted from the broadcaster may include broadcast data to be output to the mobile terminal, and channel information regarding available channels. The structure of a frame is described below in more detail with reference to FIG. 3.

When the user selects a particular channel, the broadcast reception unit 210 conducts scanning for frequency associated with the selected channel under the control of the control unit 230. The broadcast reception unit 210 receives a frame carried by the scanned frequency and transmits the frame to the control unit 230. Channel information may include information regarding the size of a frame to be received, the length of the sleep interval to the next frame and the reception time of the next frame. Channel information may further include detailed information on broadcast data present in the frame such as category, title and scheduled air time.

The display unit 220 displays various information regarding overall states and operations of the mobile terminal under the control of the control unit 230. More particularly, the display unit 220 may display a list of available channels identified through frequency scanning under the control of the control unit 230. The display unit 220 may further display signal level indicators for the channels. The display unit 220 may further display information regarding broadcast data on the channels such as category, title and scheduled air time. The display unit 220 may play back broadcast data received on a selected channel under the control of the control unit 230.

The control unit 230 controls the overall states and operations of the components in the mobile terminal. More particularly, in the mobile broadcast service mode, the control unit 230 controls the broadcast reception unit 210 to scan for frequency corresponding to a channel assigned to one broadcaster. The control unit 230 controls the broadcast reception unit 210 to receive a frame carried by the scanned frequency. The received frame may include detailed information on a channel associated with a particular frequency (i.e., channel information) and broadcast data. Here, the channel information may include information regarding the size of a frame to be received, the length of the sleep interval to the next frame and the reception time of the next frame, and may further include detailed information on broadcast data present in the frame such as category, title and scheduled air time.

The control unit 230 analyzes the received frame and detects channel information and broadcast data. The control unit 230 controls the display unit 220 to display detailed information on broadcast data of available channels. The control unit 230 causes display of signal level indicators for the channels together with the detailed information on broadcast data. To achieve this, the control unit 230 includes a channel quality examiner 235.

The channel quality examiner 235 determines the signal level of frequency scanned by the broadcast reception unit 210. The channel quality examiner 235 determines whether the determined signal level of the frequency is less than a preset threshold signal level. The channel quality examiner 235 creates a list of frequencies having a signal level greater than or equal to the threshold signal level and provides the list and associated signal level information to the control unit 230. The control unit 230 then examines the frequency list and associated signal level information and controls the display unit 220 to display a list of channels corresponding to the frequency list and related signal level indicators.

The control unit 230 may cause scanning for frequency corresponding to a preset preference channel during a sleep interval at which a frame carrying broadcast data is not transmitted. The control unit 230 may detect channel information present in a frame carried by the scanned frequency, and update channel information stored in the storage unit 250 using the detected channel information. A procedure for updating channel information is described in more detail below with reference to FIG. 3.

The control unit 230 controls the display unit 220 to output broadcast data carried by frequency mapped to a selected channel. The control unit 230 identifies the signal level of the frequency corresponding to the current channel. The signal level of frequency may be determined by signal quality of the frame. For example, when a received frame shows a low signal quality, the control unit 230 may regard the signal level of the corresponding frequency as weak. The signal quality of a frame may be determined by the number of errors occurring in the frame, and a large number of errors may indicate a low signal quality of the frame.

When the signal level of the frequency is less than a threshold signal level, the control unit 230 refers to updated channel information stored in the storage unit 250. The updated channel information includes signal level data of frequencies mapped to individual channels. The control unit 230 creates a list of channels corresponding to frequencies having a signal level greater than or equal to the threshold signal level, and controls the display unit 230 to display the list of channels corresponding to frequencies having an acceptable signal level.

When the user requests a channel switch, the control unit 230 controls the display unit 220 to display information regarding current broadcasts of available channels using the channel information updated in advance. The control unit 230 may control the display unit 220 to display signal level indicators related to the channels together with the information on broadcasts. The control unit 230 controls the broadcast reception unit 210 to scan for frequency mapped to a channel selected by the user from the displayed information on broadcasts. The control unit 230 analyzes a frame carried by the scanned frequency and outputs broadcast data present in the frame.

As described above, in response to a channel switch request, through updating channel information in advance, the control unit 230 may display current channel information without scanning for frequencies mapped to channels. Hence, the user may readily select a desired channel based on the displayed channel information without having to wait for completion of frequency scanning.

The control unit 230 may determine the remaining battery capacity before frequency scanning. That is, when the remaining battery capacity is greater than or equal to a preset threshold capacity, the control unit 230 may control the broadcast reception unit 210 to conduct frequency scanning.

When frame reception is started, the control unit 230 may determine the signal quality at the beginning of the frame. If the signal quality is low at the beginning of the frame, the control unit 230 may control the broadcast reception unit 210 to scan for frequency mapped to a different channel for a time duration from the current frame to the next frame, and for updating channel information. The signal quality refers to error probability of a frame, and a low signal level of frequency indicates low signal quality.

The input unit 240 transmits alphanumeric information and input signals for manipulation of the mobile terminal such as various function settings from the user to the control unit 230. The input unit 240 may include a touch screen or a keypad. The input unit 240 may include alphanumeric keys, function keys, and soft keys. More particularly, the input unit 240 may include a function key for entering the mobile broadcast service mode, and a channel switch key for requesting a channel switch.

The storage unit 250 may store application programs for executing various functions of the mobile terminal, and data generated by execution of the functions. More particularly, the storage unit 250 may store channel information 255 under the control of the control unit 230.

Hereinabove, a description is given of the mobile terminal capable of providing a mobile broadcast service using an interval with a frame carrying broadcast data and a sleep interval without a frame. A description is given below of the format of a frame carried by frequency.

Figure 3:
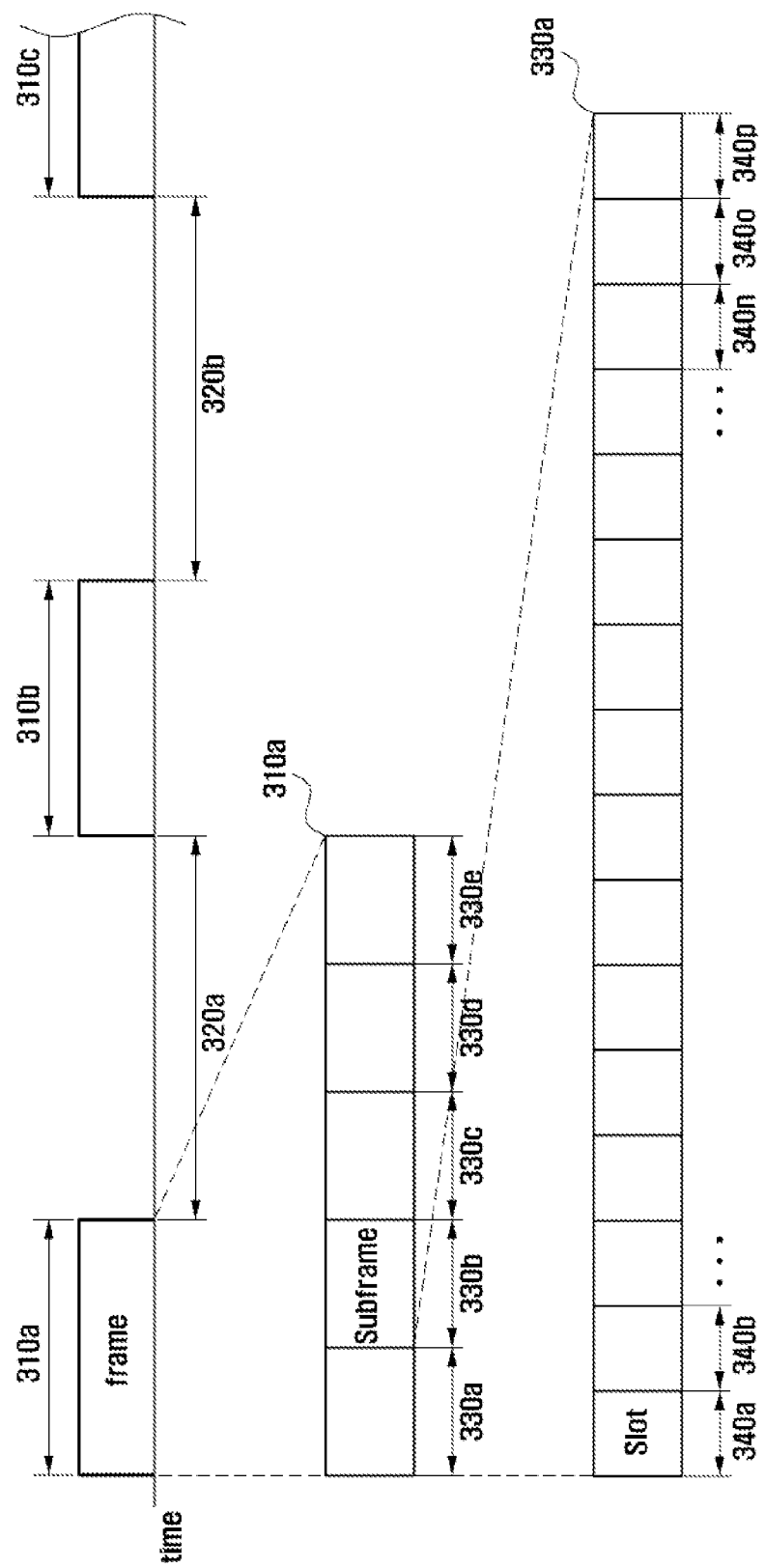
FIG. 3 illustrates a frame structure for mobile broadcast services according to an exemplary embodiment of the present invention.

FIG. 3 illustrates a frame structure for mobile broadcast services according to an exemplary embodiment of the present invention.

Referring to FIG. 3, broadcast data of each broadcaster is transmitted to mobile terminals in the form of frames 310a, 310b and 310c carried by frequency assigned to each broadcaster. A preset time interval is present between successive frames 310a and 310b. The time interval between the successive frames 310a and 310b is referred to as a sleep interval (320a or 320b). The sleep interval 320a may last for zero to several seconds.

One frame 310a corresponds to a duration of 0.968 seconds, and is composed of five sub-frames 330a, 330b, 330c, 330d and 330e. One sub-frame 330a is composed of 16 slots 340a to 340p. One slot 340a contains Transmission Parameter Channel (TPC) data. The TPC data may include a Start Group Number (SGN) field, a Total Number of Groups (TNoG) field, a Parade Repetition Cycle (PRC) field, and a Fast Information Channel (FIC) version field. The mobile terminal may identify the number of effective slots carrying broadcast data based on the SGN field, identify the number of slots carrying broadcast data based on the TNoG field, identify the arrival time of a frame carrying broadcast data based on the PRC field, and identify whether channel information for a specific broadcast is updated based on the FIC version field.

When channel information is updated, the mobile terminal extracts FIC data in one sub-frame 330a and parses the FIC data. The FIC data may include information related to Service Information (SI), a Fast Information Data Channel (FIDC), Multiplex Configuration Information (MCI), and Conditional Access (CA). The MCI indicates the type, location and format of a broadcast service on a channel. The SI is detailed information related to the title and channel of a broadcast service. The FIDC is used for paging, traffic information, and emergency handling services such as a disaster alert system. The CA is used for service usage authentication.

Through FIC data analysis, the mobile terminal receives channel list information, from one sub-frame 310a, including a Service Labeling Table (SLT) describing broadcast data services on a channel, and a Guide Access Table (GAT) providing information for broadcast data reception such as time synchronization. Thereafter, the mobile terminal updates the channel information stored in the storage unit 250 based on the received SLT and GAT. Hence, the mobile terminal may maintain updated channel information for each channel in the storage unit 250.

For example, assume that the mobile terminal outputs broadcast data carried by frequency A mapped to a channel A. On the frequency A, after a frame 1A carrying broadcast data is received, a sleep interval 1A lasts until a frame 2A arrives. During the sleep interval 1A, the mobile terminal scans for frequencies mapped to different channels set as a preference channel. If channel information related to a scanned frequency B mapped to a channel B is updated, the mobile terminal receives the SLT and the GAT in a frame 1B on the frequency B.

When the sleep interval 1A on the frequency A expires during the SLT and the GAT reception, the mobile terminal buffers the SLT and the GAT received on the frequency B in the storage unit 250 and receives a frame 2A on the frequency A. After reception of the frame 2A on the frequency A, the mobile terminal continues to process the buffered SLT and GAT for the frequency B during the next sleep interval.

As described above, channel information is updated in advance using FIC data in frames, and the mobile terminal does not have to parse all the FIC data in frames on individually scanned frequencies for channel switching Hence, it is possible to shorten the time required for channel switching.

A description is given below of displaying channel information and signal level indicators with reference to FIG. 4.

Figure 4:
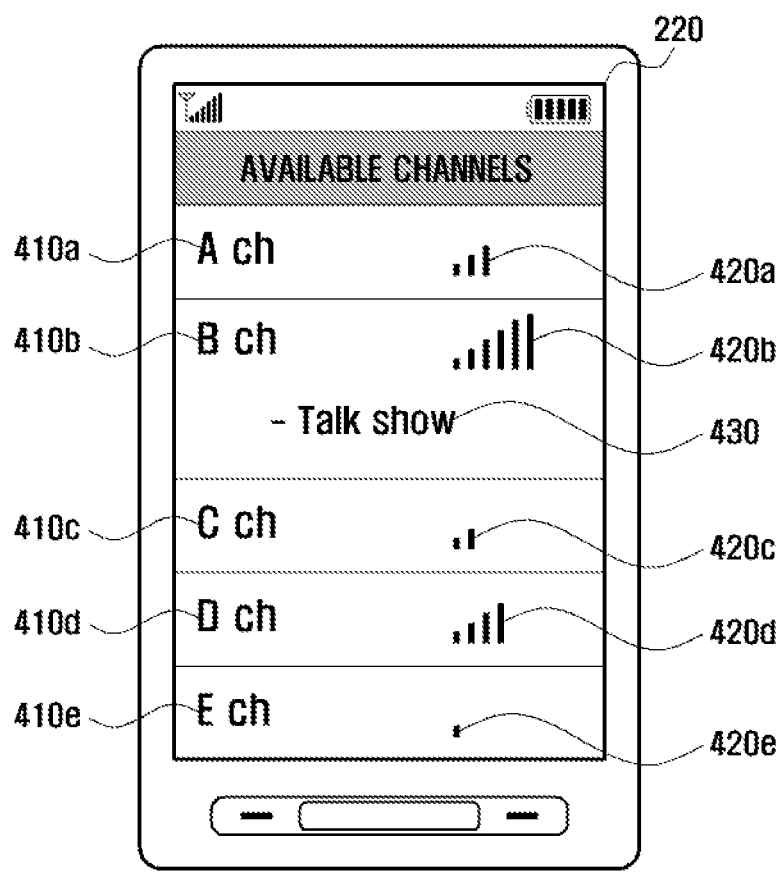
FIG. 4 illustrates a screen displaying channel information according to an exemplary embodiment of the present invention.

FIG. 4 illustrates a screen displaying channel information according to an exemplary embodiment of the present invention.

Referring to FIG. 4, when the user requests a channel switch or the signal level of a current channel falls below a preset threshold signal level, a control unit 230 may control a display unit 220 to display a list of available channels and associated signal level indicators. In FIG. 4, on the display unit 220, available channels Ach 410*a*, Bch 410*b*, Cch 410*c*, Dch 410*d* and Ech 410*e* are listed, and related signal level indicators 420*a*, 420*b*, 420*c*, 420*d* and 420*e* are also listed. The control unit 230 may control the display unit 220 to further display detailed information regarding a broadcast on a channel. For example, as illustrated in FIG. 4, "talk show" 430 is displayed as broadcast information on channel B together with Bch 410*b* and the signal level indicator 420*b*.

A detailed description is given below of channel information update with reference to FIGS. 5 and 6.

Figure 5:
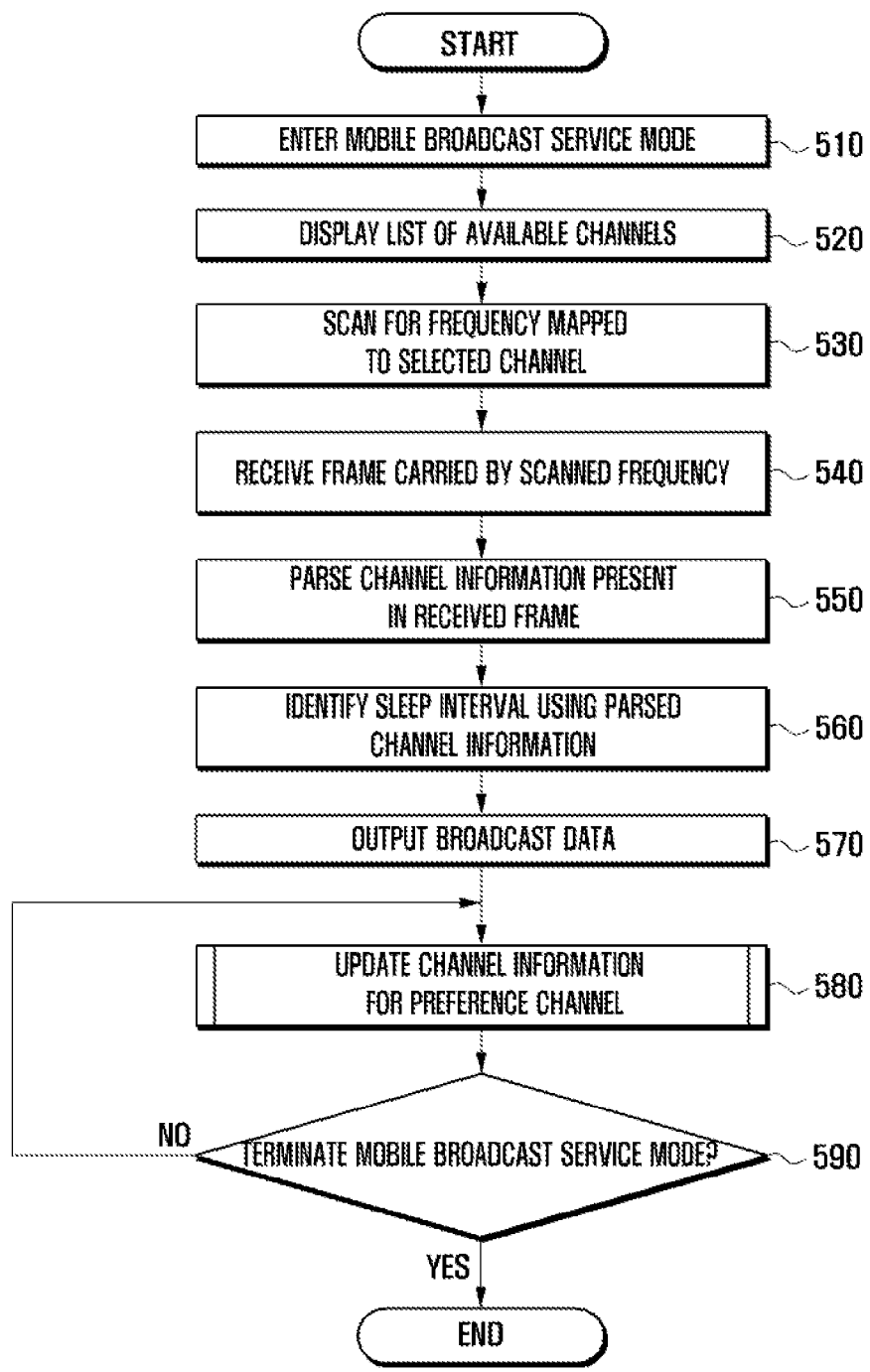
FIG. 5 is a flowchart illustrating a method for channel switching according to an exemplary embodiment of the present invention.

FIG. 5 is a flowchart illustrating a method for channel switching according to an exemplary embodiment of the present invention.

Referring to FIG. 5, when a user of a mobile terminal selects a mobile broadcast service using a function key or a menu, a control unit 230 enters into a mobile broadcast service mode in step 510. The control unit 230 scans for frequencies corresponding to channels assigned to individual broadcasters, determines signal levels of the scanned frequencies, and displays a list of channels corresponding to the frequencies having acceptable signal levels on the display unit 220 in step 520. Here, signal level indicators for the frequencies may also be displayed on the display unit 220.

When the user selects a desired channel, the control unit 230 controls the broadcast reception unit 210 to scan for frequency mapped to the selected channel in step 530. The control unit 230 receives a frame carried by the scanned frequency in step 540. The control unit 230 parses channel information present in the received frame in step 550.

The control unit 230 identifies a sleep interval between frames carrying broadcast data using the parsed channel information in step 560. For identifying the sleep interval, in the case of an ATSC-MH system, the control unit 230 determines TPC data in a received frame. The TPC data includes a TNoG field and a PRC field. Hence, the control unit 230 may determine the TNoG field and the PRC field of TPC data to identify the sleep interval between frames.

After identifying the sleep interval, the control unit 230 controls the display unit to output broadcast data in the received frame in step 570. The control unit 230 updates channel information for a preset preference channel in step 580. Channel information update is described in more detail with reference to FIG. 6.

After the channel information update, the control unit 230 determines whether a request for terminating the mobile broadcast service mode is issued in step 590. When a request for terminating the mobile broadcast service mode is not issued, the control unit 230 returns to step 580.

Figure 6:
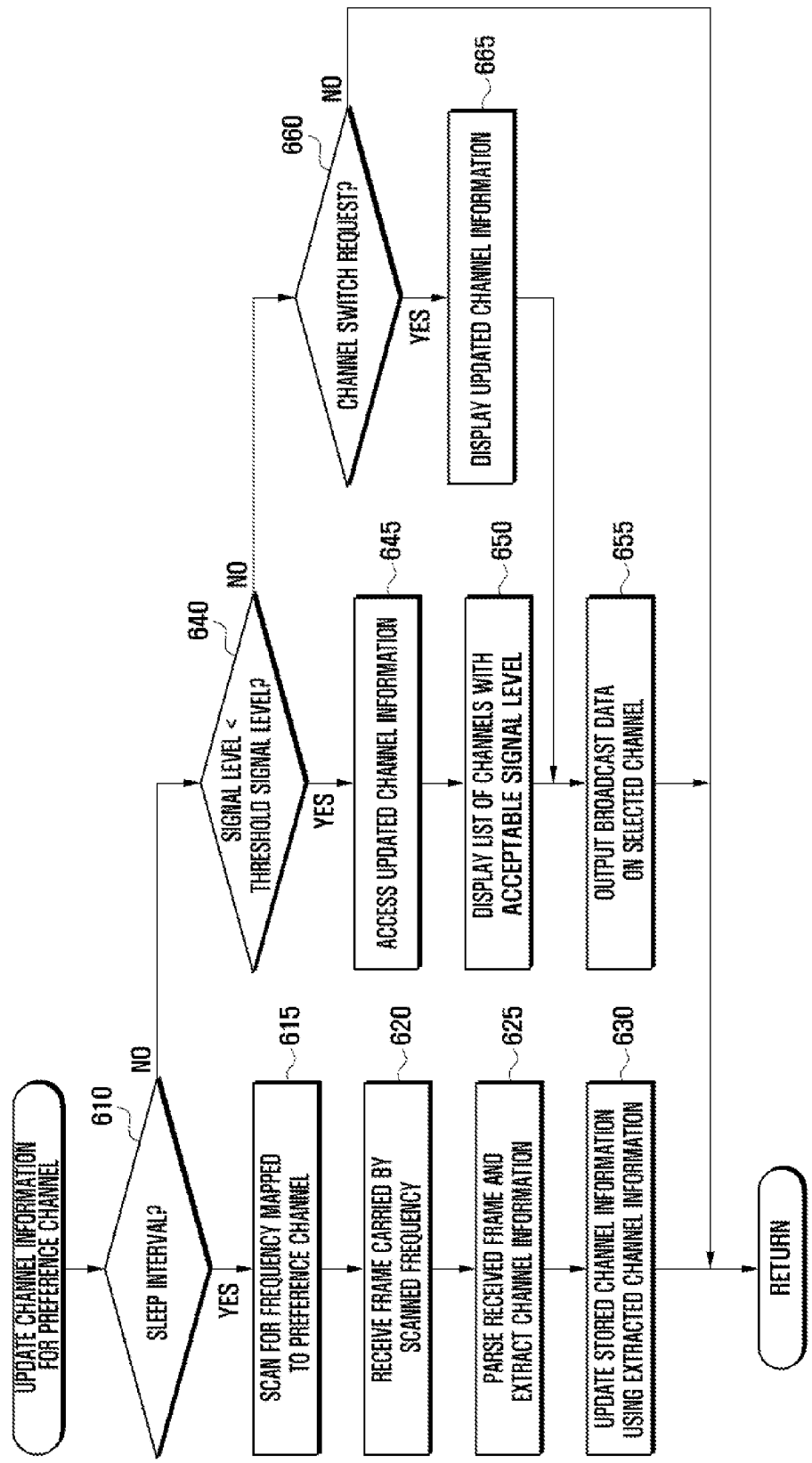
FIG. 6 is a flowchart illustrating a procedure for channel information update in the method of FIG. 5 according to an exemplary embodiment of the present invention.

FIG. 6 is a flowchart illustrating a procedure for channel information update in the method of FIG. 5 according to an exemplary embodiment of the present invention.

Referring to FIG. 6, the control unit 230 parses a received frame, outputs broadcast data extracted from the frame, and detects a sleep interval during which no frame is transmitted in step 610. When a sleep interval is detected, the control unit 230 controls the broadcast reception unit 210 to scan for frequency mapped to the preference channel in step 615.

More specifically, at the sleep interval, the control unit 230 identifies a preference channel preset by the user. The control unit 230 controls the broadcast reception unit 210 to scan for frequency mapped to the identified preference channel. Here, the preference channel may be a channel set by the user, a favorite channel frequently viewed by the user, or the previous or next channel of the current channel.

Although not illustrated, the control unit 230 may perform frequency scanning depending upon the remaining battery capacity. That is, the control unit 230 determines the remaining battery capacity. If the remaining battery capacity is below a preset capacity, the control unit 230 may skip scanning for frequency corresponding to the preference channel other than the current channel.

The control unit 230 receives the frame carried by the scanned frequency in step 620. The control unit 230 parses the received frame and extracts channel information from the frame in step 625. The control unit 230 updates channel information stored in the storage unit 250 based on the extracted channel information in step 630. In other words, the control unit 230 identifies one of sixteen slots having TPC data in a sub-frame, and determines the FIC version field of the TPC data. When the FIC version field signals updating of channel information, the control unit 230 receives FIC data from the corresponding sub-frame and parses the FIC data. The control unit 230 extracts channel list information such as SLT and GAT from the parsed FIC data. The control unit 230 updates channel information stored in the storage unit 250 based on the extracted channel list information. The channel information to be updated may include information regarding the type and title of a broadcast and reception time of the next frame.

Although not illustrated, in updating channel information after frequency scanning related to the preference channel, the control unit 230 determines an expiration of the sleep interval to resume reception of broadcast data on the channel selected by the user. That is, while conducting frequency scanning during the sleep interval, the control unit 230 determines the expiration of the sleep interval. When the sleep interval expires, the control unit 230 pauses frequency scanning related to the preference channel and receives the next frame on the selected channel. After reception of the next frame, the control unit 230 may resume and continue frequency scanning related to the preference channel for channel information update until another sleep interval expires.

When a sleep interval is not detected in step 610, the control unit 230 determines whether the signal level of the current frequency is lower than a preset threshold signal level in step 640. When the signal level of the current frequency is lower than the threshold signal level, the control unit 230 accesses updated channel information stored in the storage unit 250 in step 645. Here, the updated channel information includes signal level information for frequencies. The control unit 230 creates a list of channels having a signal level higher than or equal to the threshold signal level based on the updated channel information.

The control unit 230 displays the list of channels having a signal level higher than or equal to the threshold signal level on the display unit 220 in step 650. The control unit 230 also displays signal level indicators for the channels. That is, the control unit 230 controls the display unit 220 to display both a list of channels and associated signal level indicators.

The control unit 230 controls the broadcast reception unit 210 to scan for frequency corresponding to a channel selected by the user, and outputs broadcast data carried by the frequency corresponding to the selected channel in step 655.

When the signal level of the current frequency is not lower than the threshold signal level, the control unit 230 determines whether a channel switch request is made through the input unit 240 in step 660. When a channel switch request is made, the control unit 230 accesses the updated channel information and displays the updated channel information on the display unit 220 in step 665. That is, in response to a channel switch request, updated channel information is immediately displayed without frequency scanning. Hence, the user may rapidly select a desired channel for channel switching without awaiting completion of frequency scanning. Here, it is depicted that determining whether a channel switch request is made in step 660 is performed when the signal level is higher than or equal to the threshold signal level during frame reception. However, exemplary embodiments of the present invention are not limited thereto. That is, a channel switch request is made by the user when the signal level is lower than the threshold signal level during frame reception.

According to exemplary embodiments of the present invention, for updating channel information for the first time, the mobile terminal may play back broadcast data of a channel that is located first. Simultaneously with broadcast data reception, the mobile terminal updates channel information of a different channel through frequency scanning. Hence, the channel search time experienced by the user for viewing channel information may be shortened. In addition, when the quality of broadcast reception from the current channel is not acceptable, the mobile terminal may present information on other acceptable channels based on channel information updated in advance.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A channel control method for a mobile terminal that receives a mobile broadcast service providing a sleep interval between successive frames carrying broadcast data, the method comprising:
   outputting broadcast data present in a frame received on a current channel during a frame transport interval;
   scanning, during a sleep interval after the frame transport interval, for at least one frequency corresponding to a preset preference channel;
   extracting channel information by parsing a frame carried by the scanned frequency; and
   storing the extracted channel information while updating existing channel information,
   wherein the scanning for at least one frequency comprises:
      determining whether a remaining battery capacity is at least one of greater than and equal to a preset threshold capacity; and
      skipping, when the remaining battery capacity is less than the threshold capacity, frequency scanning for the preset preference channel.

2. The method of claim 1, wherein the outputting of the broadcast data present in a frame comprises:
   accessing, when the signal level of frequency mapped to the current channel is lower than a preset threshold signal level, the stored channel information; and
   displaying a list of channels corresponding to the stored channel information, and outputting broadcast data received on a channel selected from the displayed list.

3. The method of claim 2, wherein the outputting of the broadcast data present in a frame further comprises:
   displaying, when a channel switch request is made, the updated channel information; and
   outputting broadcast data received on a channel selected from the displayed channel information.

4. The method of claim 2, wherein the displaying of the list of channels comprises displaying both a list of channels corresponding to the channel information and signal level indicators for frequencies mapped respectively to the channels.

5. The method of claim 1, wherein the scanning for the at least one frequency corresponding to the preset preference channel comprises:
   determining an expiration of the sleep interval.

6. The method of claim 5, wherein the scanning for the at least one frequency corresponding to the preset preference further comprises:
   pausing the scanning for the at least one frequency corresponding to the preset preference channel; and
   receiving a next frame on a selected channel, if it is determined that the sleep interval expires.

7. The method of claim 6, wherein the scanning for the at least one frequency corresponding to the preset preference further comprises:
   resuming scanning for at least one frequency corresponding to the preset preference channel until the sleep interval expires.

8. A mobile terminal capable of channel control comprising:
   a broadcast reception unit for receiving a frame carrying broadcast data on frequency corresponding to a selected channel, and for scanning for at least one frequency corresponding to a preset preference channel;
   a display unit for outputting broadcast data;
   a control unit for identifying a sleep interval during which no frame is transmitted based on channel information of a received frame, for controlling the display unit to output broadcast data present in the received frame, for controlling the broadcast reception unit to frequency scan during the sleep interval, and for extracting channel information by parsing a received frame carried by the scanned frequency; and a storage unit for storing the extracted channel information while updating existing channel information for each frequency under the control of the control unit, wherein the control unit determines a remaining battery capacity, and skips, when remaining battery capacity is less than a preset threshold capacity, frequency scanning for the preference channel.

9. The mobile terminal of claim 8, wherein, when the signal level of frequency mapped to the selected channel is lower than a preset threshold signal level, the control unit controls the broadcast reception unit to scan for at least one frequency corresponding to the preset preference channel, and controls the display unit to display a list of channels mapped to frequencies with an acceptable signal level based on information on the scanned frequency.

10. The mobile terminal of claim 8, wherein, when a channel switch request is made, the control unit controls the display unit to display the updated channel information for each frequency and to output broadcast data received on a channel selected from the displayed channel information.

11. The mobile terminal of claim 10, wherein the control unit controls the display unit to display both the channel information and signal level indicators for individual channels.

12. The mobile terminal of claim 8, wherein the control unit determines an expiration of the sleep interval.

13. The mobile terminal of claim 12, wherein the control unit pauses the scanning for the at least one frequency corresponding to the preset preference channel and receives a next frame on a selected channel, if it is determined that the sleep interval expires.

14. The mobile terminal of claim 13, wherein the control unit resumes scanning for the at least one frequency corresponding to the preset preference channel until the sleep interval expires.

* * * * *